United States Patent [19]
Suzuki

[11] Patent Number: 5,649,317
[45] Date of Patent: Jul. 15, 1997

[54] MOBILE RADIO RECEIVER

[75] Inventor: Tadaoki Suzuki, Tokyo, Japan

[73] Assignee: Nippon Celint Company, Ltd., Tokyo, Japan

[21] Appl. No.: 423,694

[22] Filed: Apr. 18, 1995

[30] Foreign Application Priority Data

Apr. 25, 1994 [JP] Japan ................. 6-004372 U

[51] Int. Cl.⁶ ................ H04B 1/06; H05K 11/02
[52] U.S. Cl. .................. 455/345; 455/90; 455/575
[58] Field of Search ................ 455/89, 90, 128, 455/343, 345, 346, 351; 381/86; D12/188, 189

[56] References Cited

U.S. PATENT DOCUMENTS

| | | |
|---|---|---|
| D. 304,920 | 12/1989 | Schifrin ................ D12/188 |
| 3,950,701 | 4/1976 | Matuoka et al. . |
| 4,443,831 | 4/1984 | Godfrey et al. . |
| 4,974,129 | 11/1990 | Grieb et al. . |

*Primary Examiner*—Reinhard J. Eisenzopf
*Assistant Examiner*—Gertrude Arthur
*Attorney, Agent, or Firm*—Hill, Steadman & Simpson

[57] ABSTRACT

A mobile radio receiver is provided which can be mounted on a rearview mirror and can properly perform its original functions. The mobile radio receiver includes a case incorporating a radio receiving section, a reception circuit section, a reception display section, and a power supply battery and having an outer shape almost matching with a rearview mirror, mounting members arranged such that the case can be detachably mounted and fixed on the rear surface side of the rearview mirror, a solar panel mounted on the case such that a light-receiving surface of the solar panel is set at a predetermined position on the front side of the case. The radio receiving section is arranged on the front side of the case and designed to receive a radio wave from the front. The mounting members have upper and lower gripping portions for gripping upper and lower end portions of the rearview mirror, and one of the gripping portions respectively serving as upper and lower gripping portion is elastically engaged with the rearview mirror.

3 Claims, 3 Drawing Sheets

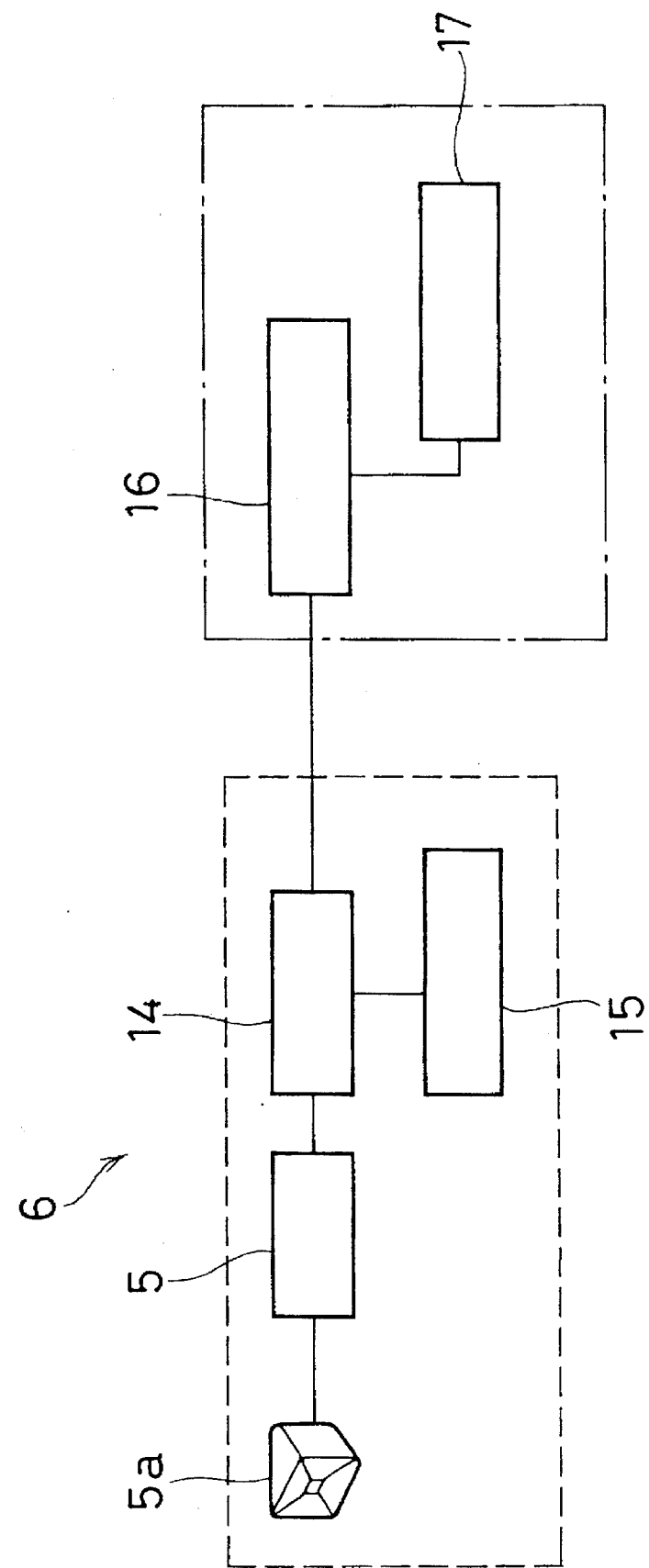

MOBILE RADIO RECEIVER

BACKGROUND OF THE INVENTION

The present invention relates to a radio receiver and, more particularly, to a mobile radio receiver capable of accurately receiving a radio wave transmitted from the front of an automobile.

A radio receiver capable of receiving, in the compartment of a vehicle such as an automobile, a radio wave transmitted from the front in the traveling direction of the vehicle is known. This radio receiver is constituted such that a radio receiving section, a reception circuit section, and the like are incorporated in a box-like case. As conventional radio receivers of this type, a so-called solar rechargeable cordless type radio receiver, a non-rechargeable cordless type radio receiver, a wired power supply type radio receiver, and the like are known.

Of these radio receivers, the solar rechargeable cordless type radio receiver comprises a solar battery as a power supply; the non-rechargeable cordless type radio receiver comprises a replaceable dry battery; and the wired power supply type radio receiver receives a power from a battery mounted in a vehicle, a cigarette lighter socket, or the like. This wired power supply type radio receiver is most popularly used.

When such a mobile radio receiver is to be mounted, the mobile radio receiver can be mounted at a proper position of, a rearview mirror, a flip-down sun visor, a dashboard, or the like. A non-rechargeable cordless type radio receiver may be put in a pocket of the clothing of a driver or the like.

When the wired power supply type radio receiver is used, a wiring for connecting the power supply and the radio receiver main body is complicated. In addition, in the non-rechargeable cordless type radio receiver, a dry battery must be replaced with a new one each time the dry battery or the like is dead.

In addition, especially, a solar rechargeable cordless type radio receiver which is designed to be mounted on a rearview mirror has not been known. The solar rechargeable cordless type radio receiver is considerably limited to its arrangement because the radio receiver must receive a sunbeam. Since the radio receiver is limited to its arrangement, the radio receiver cannot be easily mounted on the rearview mirror.

SUMMARY OF THE INVENTION

It is an object of the present invention to provide a mobile radio receiver which can be mounted on a rearview mirror and can properly perform its original functions.

According to the present invention, there is provided a mobile radio receiver comprising a case incorporating a radio receiving section, a reception circuit section, a reception display section, and a power supply battery and having an outer shape almost matching with a rearview mirror, mounting members arranged such that the case is detachably mounted and fixed on a rear surface side of the rearview mirror, and a solar panel arranged on the case such that a light-receiving surface of the solar panel is set at a predetermined position on a front side of the case, wherein the radio receiving section is arranged on the front side of the case and designed to receive a radio wave from the front.

In the mobile radio receiver according to the present invention, especially, the mounting members have gripping portions for gripping upper and lower end portions of the rearview mirror, and one of the gripping portions respectively serving as upper and lower gripping portions is elastically engaged with the rearview mirror.

In addition, in the mobile radio receiver according to the present invention, the case has a recessed portion for preventing the case from interfering with a support hinge of the rearview mirror.

In the mobile radio receiver according to the present invention, the case having the radio receiving section, the reception circuit section, and the like is mounted on the rear surface side of the rearview mirror. The radio receiving section is arranged on the front side (the front side of a vehicle) of the case mounted as described above. For this reason, a radio wave transmitted from the front in the traveling direction of a vehicle can be reliably received by the radio receiving section. In addition, since the solar panel is set on the front surface side of the case, an electromotive force can be effectively and efficiently generated by the solar panel to charge a solar battery. Since the case has an outer shape almost matching with the rearview mirror, the case does not interfere with the field of view in driving, thereby assuring safe driving.

In this case, when the case is to be mounted on the rear surface side of the rearview mirror, the gripping portions can be elastically engaged with it. For this reason, the case can be easily mounted, and the case can be reliably fixed to the rearview mirror.

In addition, assume that a rearview mirror is supported by a support hinge or the like extending from the ceiling of a vehicle. In this case, as the recessed portion is formed at a proper position of the case, the case can be accurately mounted on the rearview mirror without interfering with the support hinge.

BRIEF DESCRIPTION OF THE DRAWINGS

FIG. 5 is a block diagram showing an arrangement of the reception circuit section of the mobile radio receiver according to the present invention.

DETAILED DESCRIPTION OF THE PREFERRED EMBODIMENT

The preferred embodiment of a mobile radio receiver according to the present invention will be described below with reference to FIGS. 1 to 5.

Figure 1:
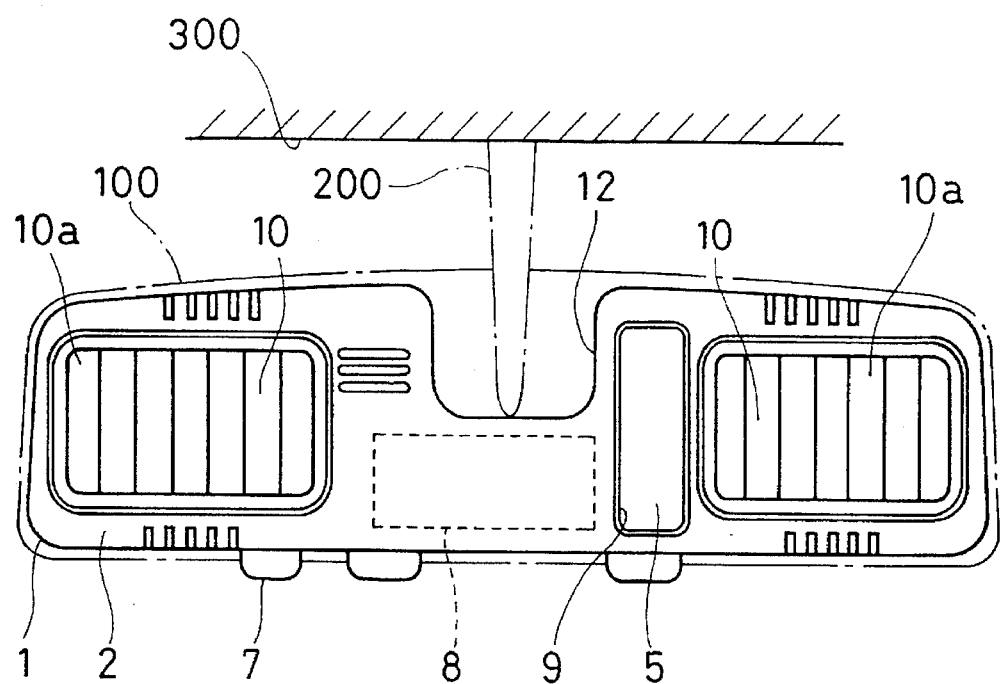
FIG. 1 is a front view showing a mobile radio receiver according to an embodiment of the present invention.

As shown in FIG. 1, a case 1 has an outer shape almost matching with a rearview mirror 100. Note that, in this embodiment, assume that the rearview mirror 100, as illustrated in FIG. 1, is supported by a support hinge 200 extending from a ceiling 300.

Figure 2:
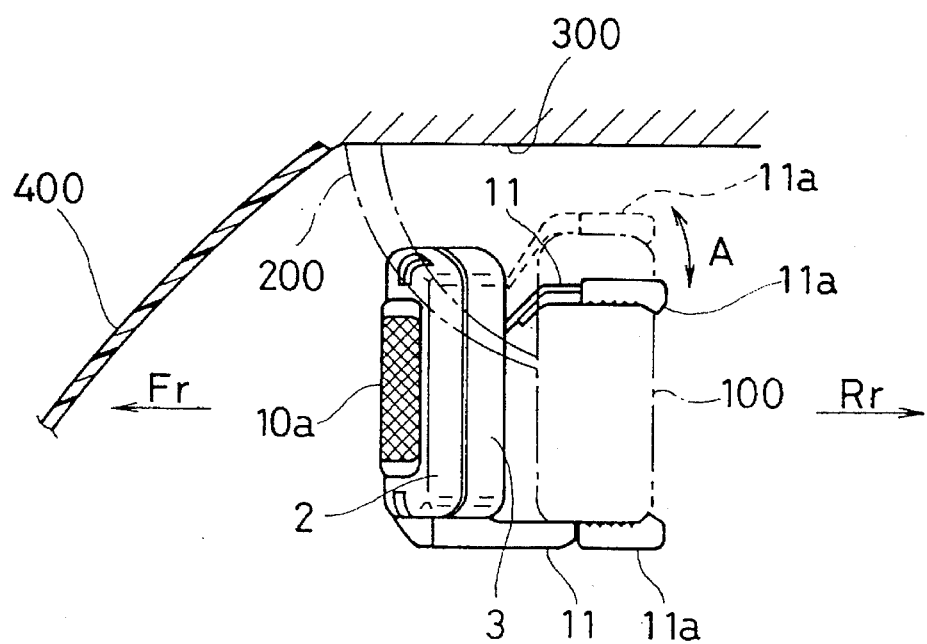
FIG. 2 is a side view showing the mobile radio receiver according to the present invention.
Figure 3:
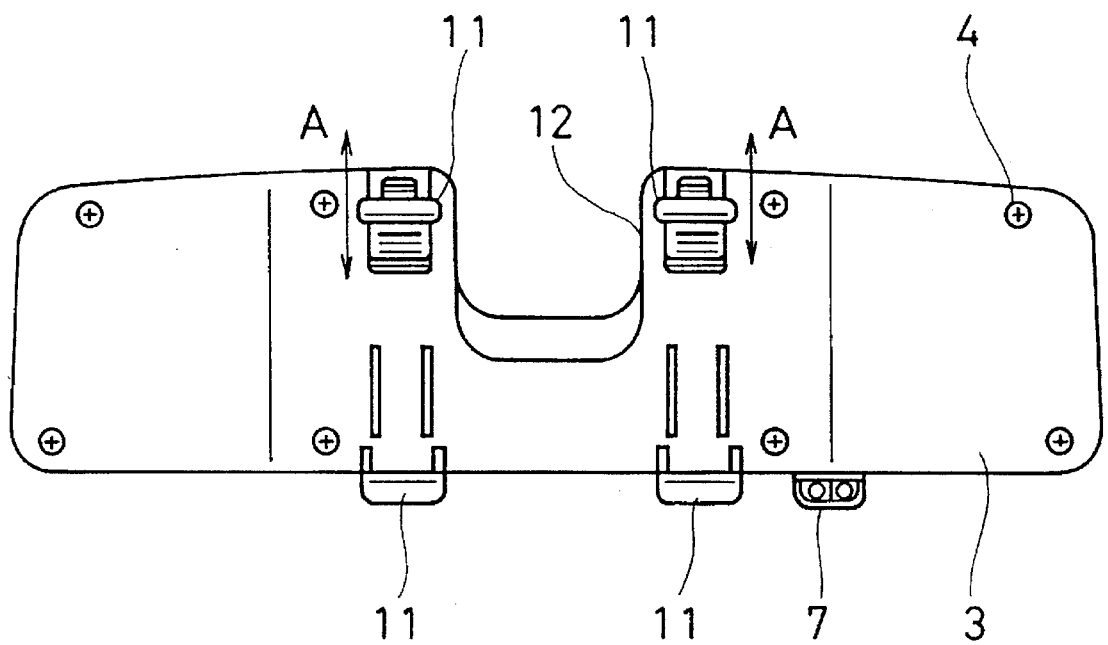
FIG. 3 is a rear view showing the mobile radio receiver according to the present invention.

A synthetic resin (ABS resin) or the like is molded into the case 1. As shown in FIG. 2, the case 1 is obtained by integrating a front cover 2 (on the side indicated by an arrow Fr) and a rear cover 3 (on the side indicated by an arrow Rr) with each other. The front cover 2 and the rear cover 3, as shown in FIG. 3, are coupled with each other using screws 4 or the like. Alternatively, an appropriate adhesive or the like can be used in place of the screws 4.

The case 1, as shown in FIG. 1, incorporates a radio receiving section 5, a reception circuit section 6 (FIG. 5), a reception display section 7, and a power supply battery 8. The radio receiving section 5 functioning as a receiving antenna is fitted in an opening portion 9 of the front cover 2, and a radio-transmitting sheet material adheres to the surface of the radio receiving section 5. As will be described later, the reception circuit section 6 processes a radio wave received by the radio receiving section 5, and the reception circuit section 6 causes the reception display section 7 or the like to display the obtained result. This reception display section 7 is constituted by, e.g., an LED and the like, and arranged at a proper position, such as a position of the lower portion of the case 1.

On the front cover 2, as shown in FIGS. 1 and 2, solar panels 10 are mounted such that light-receiving surfaces 10a of the solar panels 10 are set on the front surface of the case 1. As the solar panels 10, one pair of solar panels are arranged on both the left and right sides of the front cover 2 as shown in FIG. 1. Each solar panel 10, as shown in FIG. 2, is arranged at a position close to a windshield 400 and is set to efficiently receive a sunbeam. The solar panel 10 is connected to the power supply battery 8 (FIG. 1) to charge it.

Note that the power supply battery 8 can be charged by not only the solar panels 10 but also a cigarette lighter socket (12 V or 24 V) or the like. These charging methods can be appropriately switched. In addition, when the voltage of the power supply battery 8 becomes lower than a predetermined voltage, a remaining amount alarm informs a driver or the like of it.

The case 1 is detachably mounted and fixed on the rear surface side of the rearview mirror 100 with mounting members 11. In this embodiment, the case 1 has two pairs of mounting members 11 (a total of four mounting members) each pair of which are constituted by a pair of upper and lower mounting members extending from the case 1. The mounting members 11 have gripping portions 11a for gripping the upper and lower end portions of the rearview mirror 100. More specifically, the lower mounting members 11 are of a fixed type, and the upper mounting members 11 are arranged such that the upper mounting members 11 can be moved within a predetermined range as indicated by an arrow A in FIG. 2. In this manner, as shown in FIG. 2, the rearview mirror 100 is elastically engaged such that the rearview mirror 100 is vertically sandwiched between the mounting members 11. Note that, in contrast to the above arrangement, the upper mounting members 11 may be of a fixed type, and the lower mounting members 11 may be arranged to be moved. In addition, as shown in FIGS. 1 and 3, a recessed portion 12 is formed in the case 1 such that the case 1 does not interfere with the support hinge 200. Especially, the depth (vertical direction) or the like of the recessed portion 12 is appropriately set depending on the relationship between the depth and the mounted position of the support hinge 200, the size of the support hinge 200, or the like.

Figure 4:
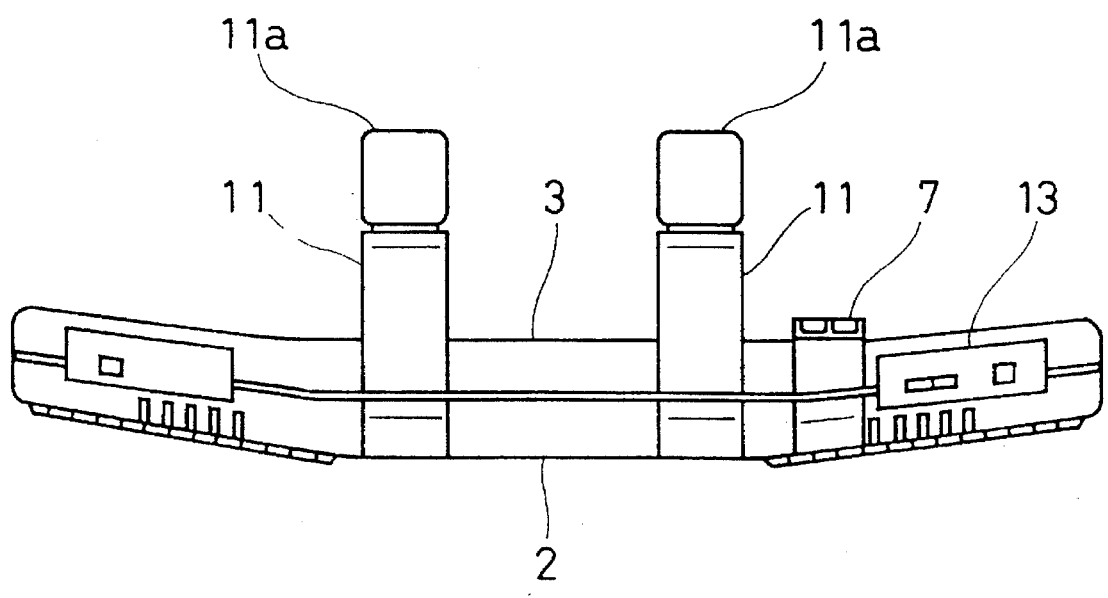
FIG. 4 is a bottom view showing the mobile radio receiver according to the present invention.

In this case, as shown in FIG. 4, an operation section 13 in which switches and the like for adjusting the output, sensitivity, or the like of the radio receiver is arranged at a proper position of the lower end portion or the like of the case 1. In addition, the radio receiver of the present invention has a so-called automatic power switch for inhibiting the operation of the radio receiver when a vehicle on which the radio receiver is mounted is stopped. This automatic power switch is arranged to check, depending on a detection signal from a vibration sensor for detecting engine vibration, body vibration, or the like, whether the vehicle is traveling, and to turn off the circuit operation at least when the vehicle is stopped.

FIG. 5 shows an arrangement of the reception circuit section 6. Referring to FIG. 5, reference numeral 14 denotes a mixer circuit; 15, a second local oscillator circuit; 16, a second intermediate-frequency amplifier circuit; and 17, a detector circuit. In the present invention, a so-called superheterodyne scheme (double superheterodyne scheme) is employed. According to this scheme, a received radio wave is converted into a radio wave having a frequency which can be amplified to make reception of a weak radio wave possible. More specifically, according to the scheme, the radio waves are received such that the frequencies of all the radio waves are set to be a predetermined frequency, and this predetermined frequency serves as an intermediate frequency.

The nominal frequency of a received radio wave is 10.525 GHz. In practice, the error of this nominal value or the like is considered. In this case, the range of reception frequencies is set to be a 50-MHz range, i.e., a range of 10.500 to 10.550 GHz.

A radio wave received by the radio receiving section 5 is mixed with a first local oscillation frequency in a mixer circuit 5a to convert the frequency of the radio wave into a frequency of 1.03 GHz (first intermediate frequency). After the frequency is amplified by the first intermediate-frequency amplifier circuit, the radio wave having the amplified frequency is mixed with the second local oscillation frequency of the second local oscillator circuit 15 by the mixer circuit 14 to convert the frequency into 10.7 MHz (second intermediate frequency). This intermediate frequency is amplified by the second intermediate-frequency amplifier circuit 16. The radio wave having the amplified intermediate frequency is extracted by the detector circuit 17 as a signal.

When the frequency of a received radio wave is 24.150 GHz, the frequency is mixed using a second harmonic (11:558 GHz×2=23.12 GHz) generated in first local oscillation to drop the frequency of the received radio wave to 1.03 GHz (first intermediate frequency). Thereafter, as in the above description, the radio wave is extracted by the detector circuit 17 as a signal. Furthermore, when the frequency of a received radio wave is 34.360 GHz, the radio wave is extracted by the detector circuit 17 as described above.

According to the mobile radio receiver of the present invention arranged as described above, the case 1 is mounted on the rear surface side of the rearview mirror 100 through the mounting members 11. In this case, the case 1 can be simply and reliably mounted on the rearview mirror 100 by vertically opening the two pairs of mounting members 11, and the gripping portions 11a are elastically engaged with the upper and lower end portions of the rearview mirror 100, thereby reliably fixing the case 1.

Assume that the rearview mirror 100 is supported by the support hinge 200 extending from the ceiling 300 as shown in FIGS. 1 and 2. In this case, when the recessed portion 12 is formed in the case 1, the case 1 can be accurately mounted on the rearview mirror 100 without interfering with the support hinge 200.

In the radio receiver of the present invention, mounted as described above, the solar panels 10 are set on the front surface side of the case 1, and an electromotive force is effectively and efficiently generated by the solar panels 10 to charge a rechargeable battery, i.e., the power supply battery 8. A radio wave transmitted from the front in the traveling direction of a vehicle can be reliably received by the radio receiving section 5 arranged on the front side of the case 1. The received radio wave is processed as a signal by the reception circuit section 6 as described above, and then displayed on the reception display section 7.

The case has an outer shape almost matching with the rearview mirror 100 and is mounted on the rear surface side of the rearview mirror 100. For this reason, when the radio wave receiver of the present invention is mounted, the radio wave receiver does not interfere with the field of view in driving, and safe driving can be assured. The radio receiver can be simply and reliably mounted and fixed on the rearview mirror 100 through the mounting members 11 and can be detached from the rearview mirror 100, and the radio receiver can be very easily handled. As described above, the radio receiver is a solar rechargeable cordless type radio receiver in which the power supply battery 8 is charged by the solar panels 10. For this reason, cumbersome wiring can be omitted. In addition, when the remaining amount of the power supply battery 8 decreases, a remaining amount alarm informs a driver of it. An automatic power switch can effectively cope with the case in which a driver forgets to turn off a power supply switch.

As has been described above, according to the present invention, as a mobile radio receiver of such a type, especially, a cordless type, a radio receiver of a solar rechargeable type, can be provided, which can be detachably mounted on a rearview mirror and has a novel arrangement. In addition, the radio receiver of the present invention has the following advantages. That is, the radio receiver can be easily and reliably mounted on the rearview mirror, and the radio receiver can be easily handled and is convenient in use.

What is claimed is:

1. A mobile radio receiver for attachment to a rear view mirror of a vehicle wherein the rearview mirror has a planar front side having a mirror and a planar reverse side oppositely facing the front side, the receiver comprising:

a case incorporating a radio receiving section, a reception circuit section, a reception display section, and a power supply battery and having outer dimensions no greater than outer dimensions of the mirror of the front side of the rearview mirror;

mounting members arranged such that said case is detachably mounted and fixed on said rearview mirror such that the outer dimensions do not extend beyond the outer dimensions of the mirror on the front side of the rearview mirror; and a solar panel arranged on said case such that a light-receiving surface of said solar panel is set at a predetermined position on a front side of said case wherein said radio receiving section is arranged on the front side of said case and designed to receive a radio wave from the front side of said case.

2. The receiver according to claim 1 wherein said mounting members have gripping portions for gripping upper and lower end portions of said rearview mirror, and further wherein one of said gripping portions respectively serving as upper and lower gripping portions is elastically engaged with said rearview mirror.

3. The receiver according to claim 1 wherein said case has a recessed portion for preventing said case from interfering with a support hinge of said rearview mirror.

* * * * *